(12) United States Patent
Louie et al.

(10) Patent No.: US 7,628,239 B1
(45) Date of Patent: Dec. 8, 2009

(54) ADAPTABLE REMOTE CONTROL DRIVING SYSTEM

(75) Inventors: Wallace Louie, Fredericksburg, VA (US); James L. Hebert, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 492 days.

(21) Appl. No.: 11/518,735

(22) Filed: Aug. 30, 2006

(51) Int. Cl.
*B60S 5/00* (2006.01)

(52) U.S. Cl. .................... 180/167; 73/118.01; 701/2; 701/36; 180/333; 74/512

(58) Field of Classification Search ............... 180/167, 180/316, 320, 333; 73/118.01; 701/2, 36; 74/512
See application file for complete search history.

(56) References Cited

U.S. PATENT DOCUMENTS

| | | | | |
|---|---|---|---|---|
| 2,602,348 A | * | 7/1952 | Wilson | 74/484 R |
| 2,724,285 A | * | 11/1955 | Lerman | 74/481 |
| 2,777,335 A | * | 1/1957 | William et al. | 74/481 |
| 2,805,585 A | * | 9/1957 | Besserman | 74/625 |
| 2,826,089 A | * | 3/1958 | Hammack | 74/484 R |
| 2,855,797 A | * | 10/1958 | Dunn, Jr. | 74/484 R |
| 2,875,638 A | * | 3/1959 | Sell | 74/484 R |
| 2,928,291 A | * | 3/1960 | Wilkerson | 74/494 |
| 3,003,363 A | * | 10/1961 | De Hart | 74/494 |
| 3,226,997 A | * | 1/1966 | Malloy | 74/482 |
| 3,465,577 A | * | 9/1969 | Donovan | 73/118.01 |
| 3,648,539 A | * | 3/1972 | Rouis | 74/494 |
| 3,662,593 A | * | 5/1972 | Pirrello et al. | 73/132 |
| 3,762,239 A | * | 10/1973 | Rouis | 74/494 |
| 3,877,318 A | * | 4/1975 | Castoe | 74/481 |
| 3,895,545 A | * | 7/1975 | Hunter | 74/494 |
| 4,324,309 A | * | 4/1982 | Ginley | 180/316 |
| 4,427,229 A | * | 1/1984 | Johnson | 296/180.4 |
| 4,438,835 A | * | 3/1984 | Dowden et al. | 477/193 |
| 4,453,485 A | * | 6/1984 | Houghton-Brown et al. | 114/144 A |
| 4,463,821 A | * | 8/1984 | Falamak | 180/168 |

(Continued)

OTHER PUBLICATIONS

Kairos Autoncania home page http://www.kairosautonomi.com/.

(Continued)

*Primary Examiner*—Glenn Dayoan
*Assistant Examiner*—Jacob Meyer
(74) *Attorney, Agent, or Firm*—Gerhard W. Thielman Esq.

(57) ABSTRACT

A modular system for remotely controlling an automotive vehicle is provided. The system issues commands responsive to a radio control transmitter, which controls the vehicle by its steering device and respective control pedals for acceleration and braking. The system includes a steer linkage, a steering motor, a pedal linkage, a linear actuator, a radio receiver, and a digital motor controller. By employing a chain pulley, the steer linkage removably attaches to and controllably rotates the steering device. The steering motor conveys torque to the steer linkage. The pedal linkage removably connects to and pushes against at least one of the control pedals using pinned moment levers. The linear actuator transmits force to the pedal linkage. The pedal linkage may be removably mounted on a linkage platform. The radio receiver receives command signals from the transmitter and communicates with the steering motor and the linear actuator via the digital motor controller.

17 Claims, 17 Drawing Sheets

U.S. PATENT DOCUMENTS

| | | | | | |
|---|---|---|---|---|---|
| 4,476,954 | A | * | 10/1984 | Johnson et al. | 180/333 |
| 4,627,522 | A | * | 12/1986 | Ulrich et al. | 192/35 |
| 4,657,463 | A | * | 4/1987 | Pipes | 414/495 |
| 4,742,720 | A | * | 5/1988 | Storck | 73/865.9 |
| 4,788,879 | A | * | 12/1988 | Ulrich | 74/481 |
| 4,946,013 | A | * | 8/1990 | Conlyn et al. | 477/209 |
| 5,012,689 | A | * | 5/1991 | Smith | 74/89.17 |
| 5,121,651 | A | * | 6/1992 | Bristow | 74/481 |
| 5,172,589 | A | * | 12/1992 | Witt | 73/132 |
| 5,318,143 | A | * | 6/1994 | Parker et al. | 180/168 |
| 5,363,027 | A | * | 11/1994 | Noguchi | 318/573 |
| 5,372,035 | A | * | 12/1994 | Ogawa et al. | 73/118.01 |
| 5,394,743 | A | * | 3/1995 | Noguchi et al. | 73/118.01 |
| 5,415,034 | A | * | 5/1995 | Nishikawa et al. | 73/118.01 |
| 5,542,312 | A | * | 8/1996 | Peters | 74/481 |
| 5,602,450 | A | * | 2/1997 | Cowan et al. | 318/265 |
| 5,615,581 | A | * | 4/1997 | Cordioli | 74/494 |
| 5,821,718 | A | * | 10/1998 | Shaffer et al. | 318/587 |
| 5,835,867 | A | * | 11/1998 | Froelich et al. | 701/2 |
| 5,865,266 | A | * | 2/1999 | Froelich et al. | 180/443 |
| 5,908,454 | A | * | 6/1999 | Zyburt et al. | 701/24 |
| 5,913,945 | A | * | 6/1999 | Froelich et al. | 74/512 |
| 5,991,674 | A | * | 11/1999 | Froelich et al. | 701/36 |
| 5,994,853 | A | | 11/1999 | Ribbe | 318/16 |
| 6,061,613 | A | * | 5/2000 | Zyburt et al. | 701/24 |
| 6,113,459 | A | * | 9/2000 | Nammoto | 446/454 |
| 6,141,603 | A | * | 10/2000 | Greenhill | 700/245 |
| 6,141,620 | A | * | 10/2000 | Zyburt et al. | 701/117 |
| 6,259,980 | B1 | * | 7/2001 | Peck et al. | 701/24 |
| 6,283,220 | B1 | | 9/2001 | Carter | 169/24 |
| 6,640,164 | B1 | | 10/2003 | Farwell et al. | 701/2 |
| 6,695,688 | B1 | * | 2/2004 | Owen et al. | 452/187 |
| 6,893,320 | B2 | | 5/2005 | Caiozza | 446/456 |
| 7,360,623 | B2 | * | 4/2008 | Green et al. | 180/443 |
| 7,540,826 | B2 | * | 6/2009 | Ochiai | 477/211 |
| 2002/0165648 | A1 | * | 11/2002 | Zeitler | 701/23 |
| 2006/0011397 | A1 | | 1/2006 | Huang et al. | 180/167 |
| 2006/0254839 | A1 | * | 11/2006 | Hasty et al. | 180/167 |
| 2008/0071429 | A1 | * | 3/2008 | Kraimer et al. | 701/2 |
| 2008/0269015 | A1 | * | 10/2008 | Ochiai | 477/209 |

OTHER PUBLICATIONS

Universal Unmanned Vehicle Retrofit Kit http://www.kairosautonomi.com/pronto4_kit.htm.

Pronto4™ Fact Sheet http://www.kalrosautonomi.com/downloads/Pronto4_fact_sheet.pdf.

* cited by examiner

ADAPTABLE REMOTE CONTROL DRIVING SYSTEM

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to remote control systems for automobiles. In particular, the system includes a kit of linkage components that can be adjustably and non-destructively installed for a variety of vehicles and subsequently disassembled for storage in minimal time. The system responds to control signals transmitted via a radio-remote-control device.

Test safety demands on occasion require remote control of a ground-transportation vehicle, such as that simulated by the time-traveling Delorean sportscar featured in *Back to the Future*. Such implements have typically been custom fitted to the controls subsequent to or currently with modification of the driver's position equipment, such as seat, bench or steering wheel.

SUMMARY

Conventional remote control systems yield disadvantages addressed by various exemplary embodiments of the present invention. In particular, exemplary embodiments provide component modularity for assembly and disassembly to any one of a large assortment of vehicles. Further, the exemplary embodiments enable the remote control system to be installed without permanent modification of the vehicle.

Various exemplary embodiments provide a modular system for remotely controlling an automotive vehicle. The system issues commands responsive to a radio control transmitter, which controls the vehicle by its steering device and respective control pedals for acceleration and braking. The system may include a steer linkage, a motor, a pedal linkage, an actuator, and a controller.

In various exemplary embodiments, the motor conveys torque to the steer linkage. By employing a chain pulley, the steer linkage may attach to and controllably rotate the steering device. The pedal linkage connects to and pushes against at least one of the control pedals using pinned moment levers. The actuator transmits force to the pedal linkage. The controller includes a radio receiver that receives command signals from the transmitter and communicates with the motor and the actuator, via a digital motor controller. The pedal linkage may be mounted on a linkage platform. These connections and attachments may be nondestructively removable from each other and from the vehicle.

Various embodiments provide for failsafe default commands to brake the vehicle in the event that receipt of signal is lost or during manual override. Other various embodiments alternatively or additionally provide for multiple channels for additional instructions and/or feedback.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
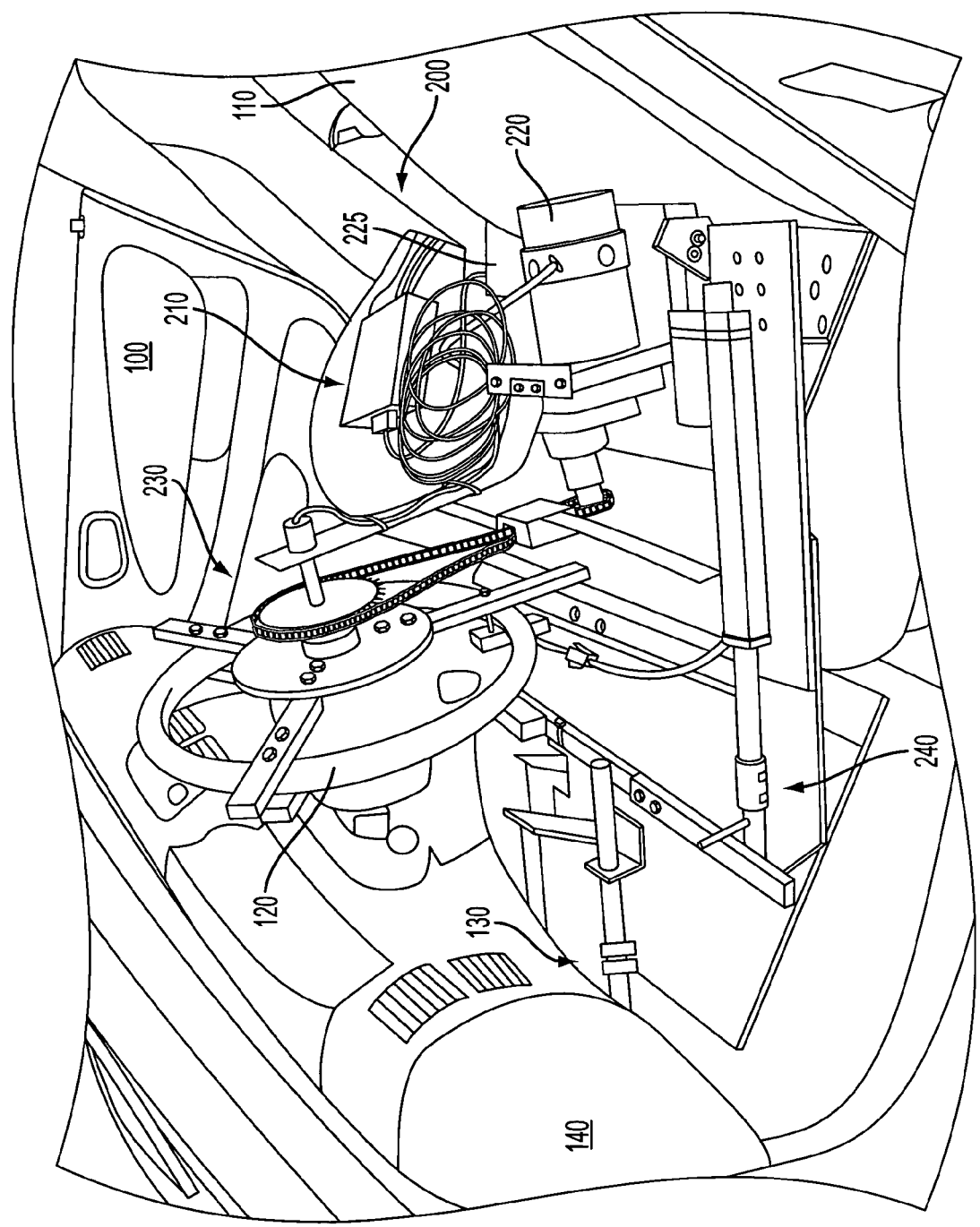
FIG. 1 is a perspective view of a vehicle interior with an exemplary remote control system installed on the driver's side.

FIG. 1 shows a perspective view of an interior 100 of a motor vehicle equipped with the remote control system installed therein. The vehicle includes a driver's seat 110, a steering wheel 120 and foot pedals 130 obscured by its dashboard 140. The remote control system represents a remote control assembly 200 as installed in the vehicle.

The assembly 200 includes a digital motor control system 210, a geared steering motor 220, which rotates the steering wheel 120 by a chain link steer pulley assembly 230, and a pedal linkage assembly 240 for controlling the foot pedals 130. Alternative to the steering wheel, a yoke may be employed as a less common mechanism to command vehicle turning, to which the pulley assembly 230 may be attached. The motor 220 may be driven by a 12-volt or 24-volt direct-current battery 225. The assembly may also be secured by straps to the seat 110.

FIGS. 2A-2D show perspective exploded views of the remote control assembly 200. The digital control system 210 includes a digital motor controller 212, cables 214, connectors 216 and a 9-channel pulse code modulation (PCM) radio receiver 218. The controller 212 connects to various actuators and feedback devices, such as motors and potentiometers, by the cables 214 and the connectors 216, as identified in FIG. 2A. The receiver 218 obtains signals from a remote transmitter to control devices in the assembly 200 using only two channels. The remaining channels may be used to control other optional devices. The receiver 218 connects to and communicates with the controller 212.

Those of ordinary skill in the art will recognize that the receiver 218 may be supplemented with a second receiver. The PCM receiver 218 typically operates at 75 MHz, whereas the second receiver may employ Spread Spectrum at 2.4 GHz. Additionally, a separate radio control may be used to disable the link independently of the assembly system 200 to enable a graceful shutdown in the event of a communications link disconnection or other control failure.

Figure 2A:
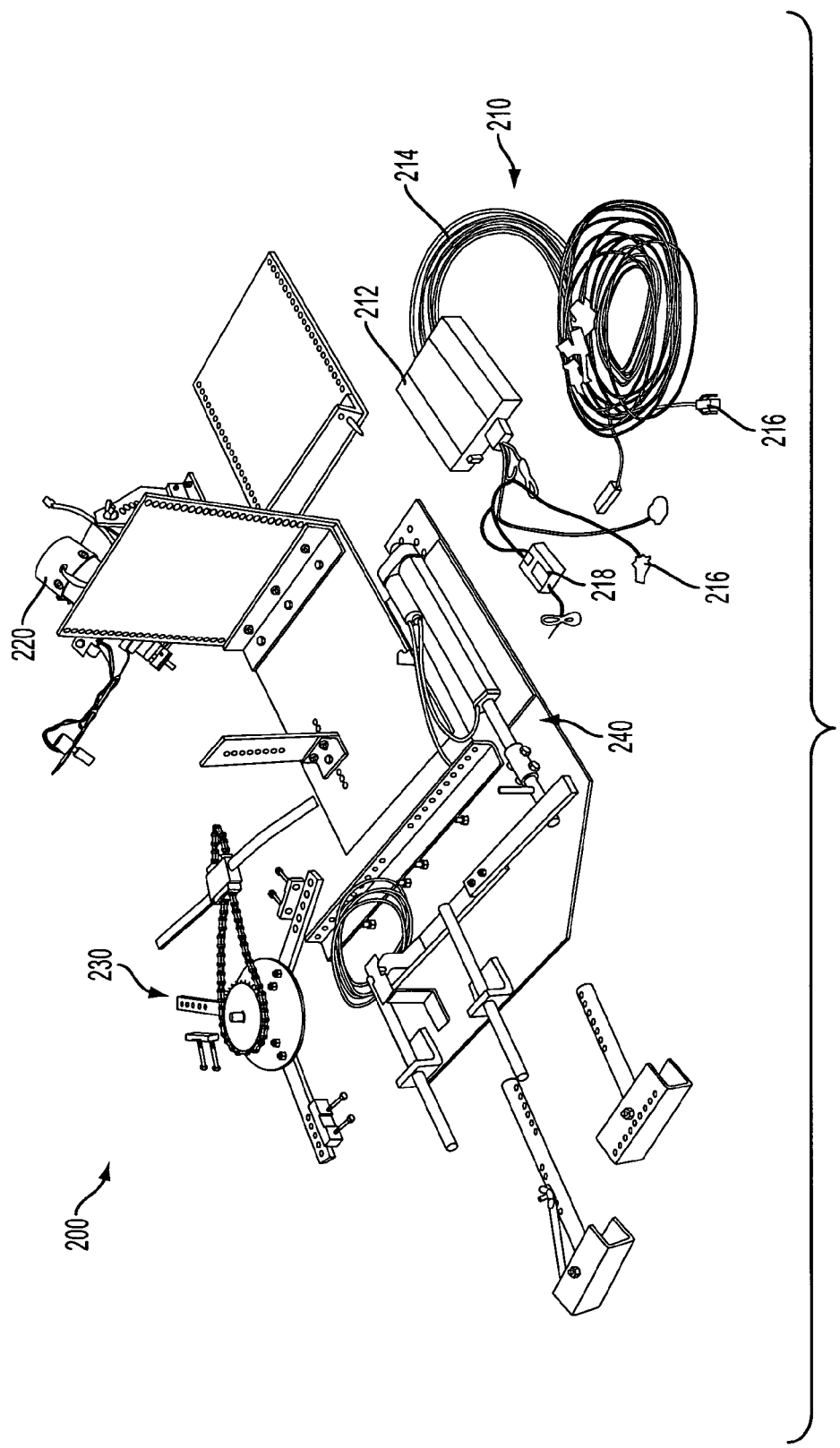
FIGS. 2A-2D are perspective exploded views of the remote control system components.
Figure 2B:
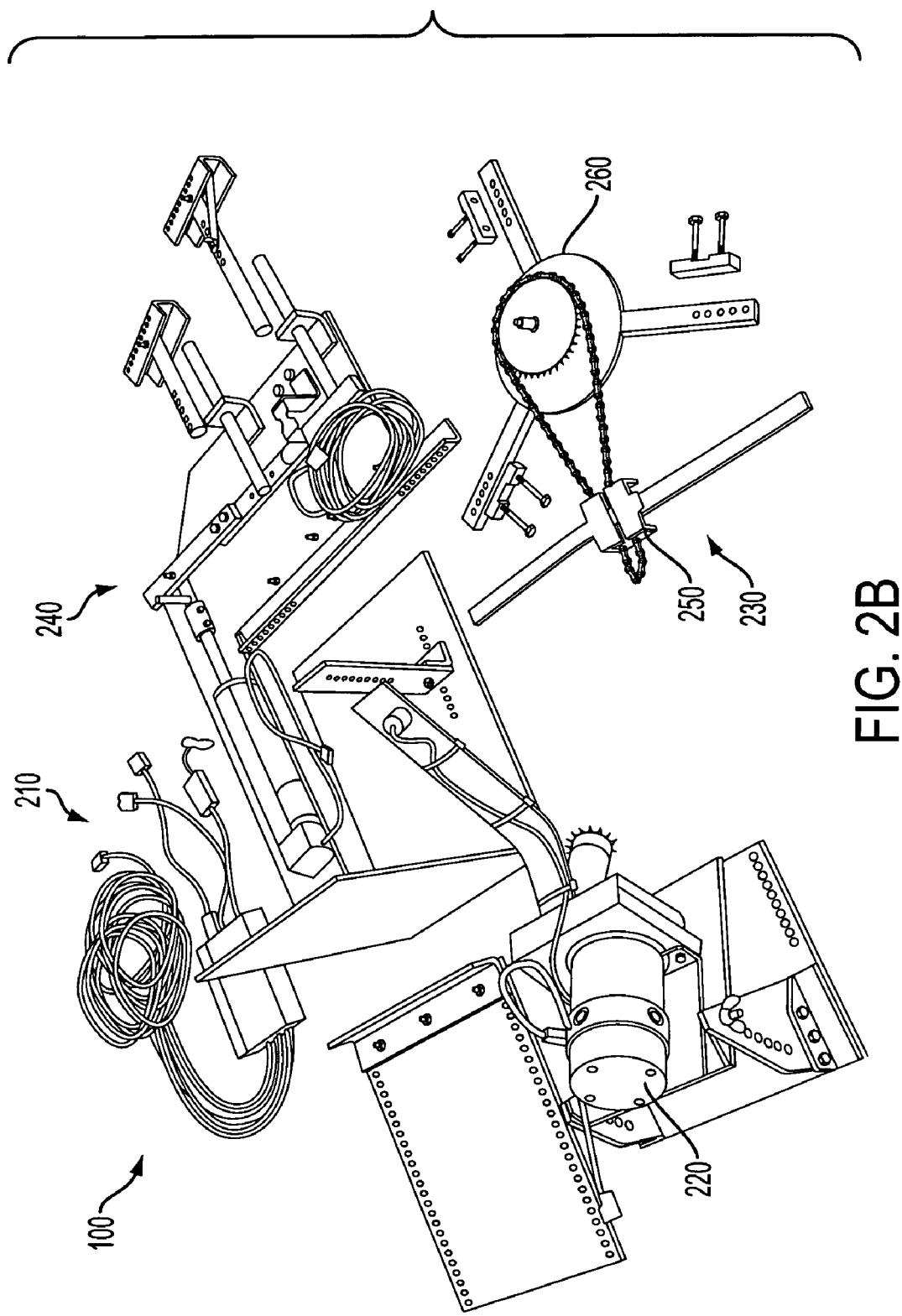

The motor controller 212 sends turn control signals to the geared steering motor 220, which rotates the vehicle's steering wheel by a steer pulley assembly 230. The motor controller 212 also sends accelerator and brake control signals to a pedal linkage assembly 240. FIG. 2B shows the pulley assembly 230 including a chain drive 250 and a wheel attachment 260, with further details shown in FIGS. 4A and 4B.

Figure 2C:
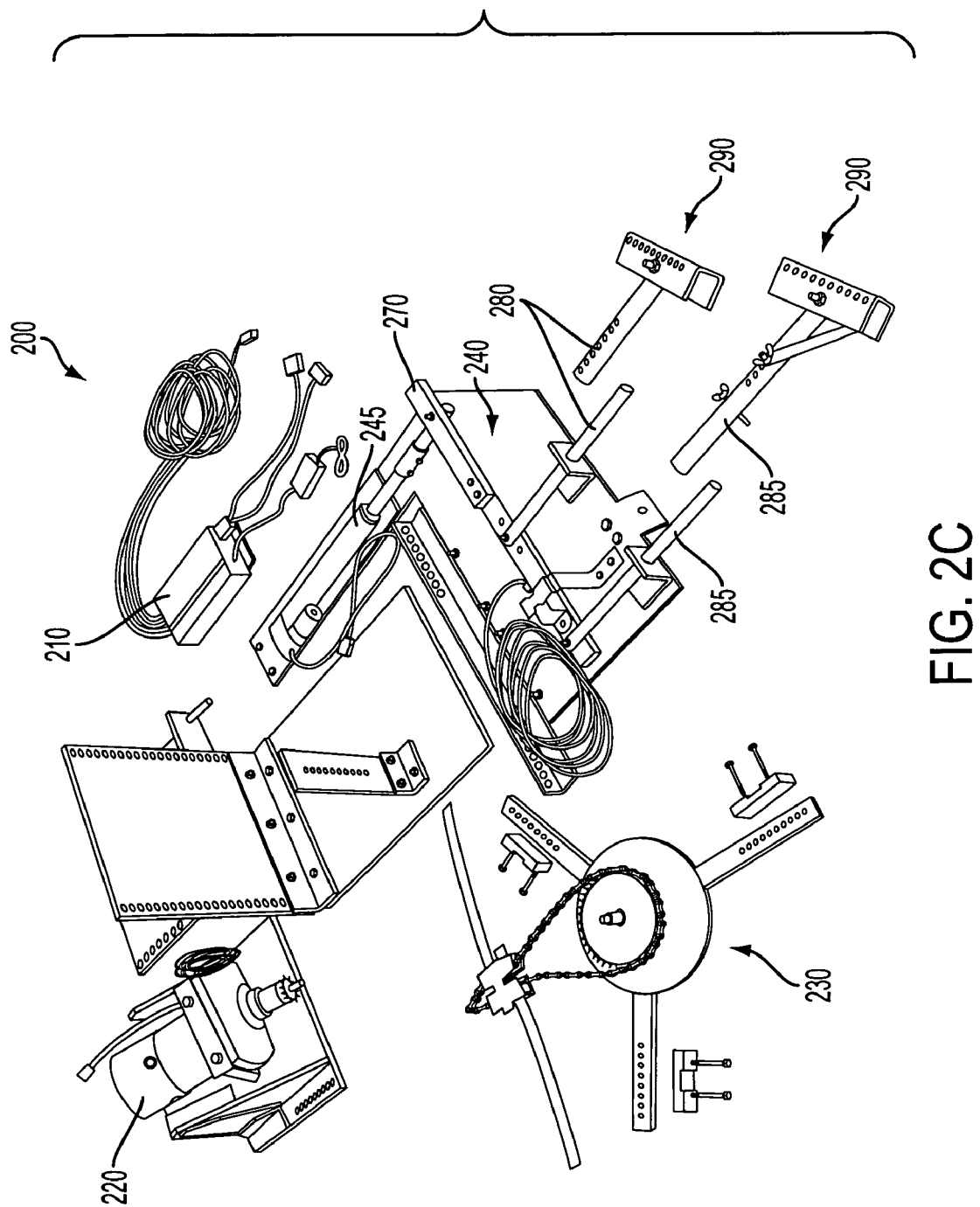
Figure 2D:
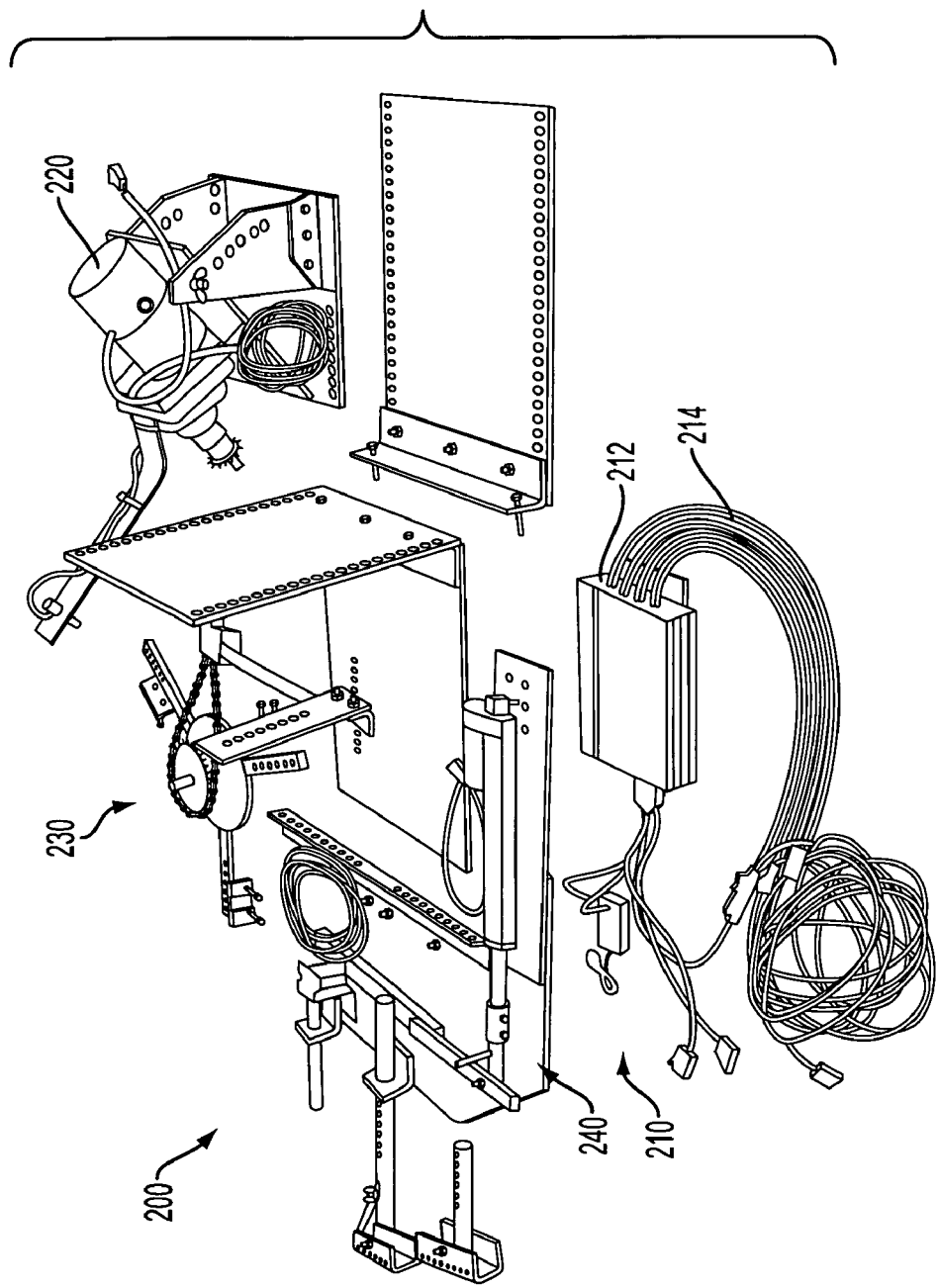
Figure 6A:
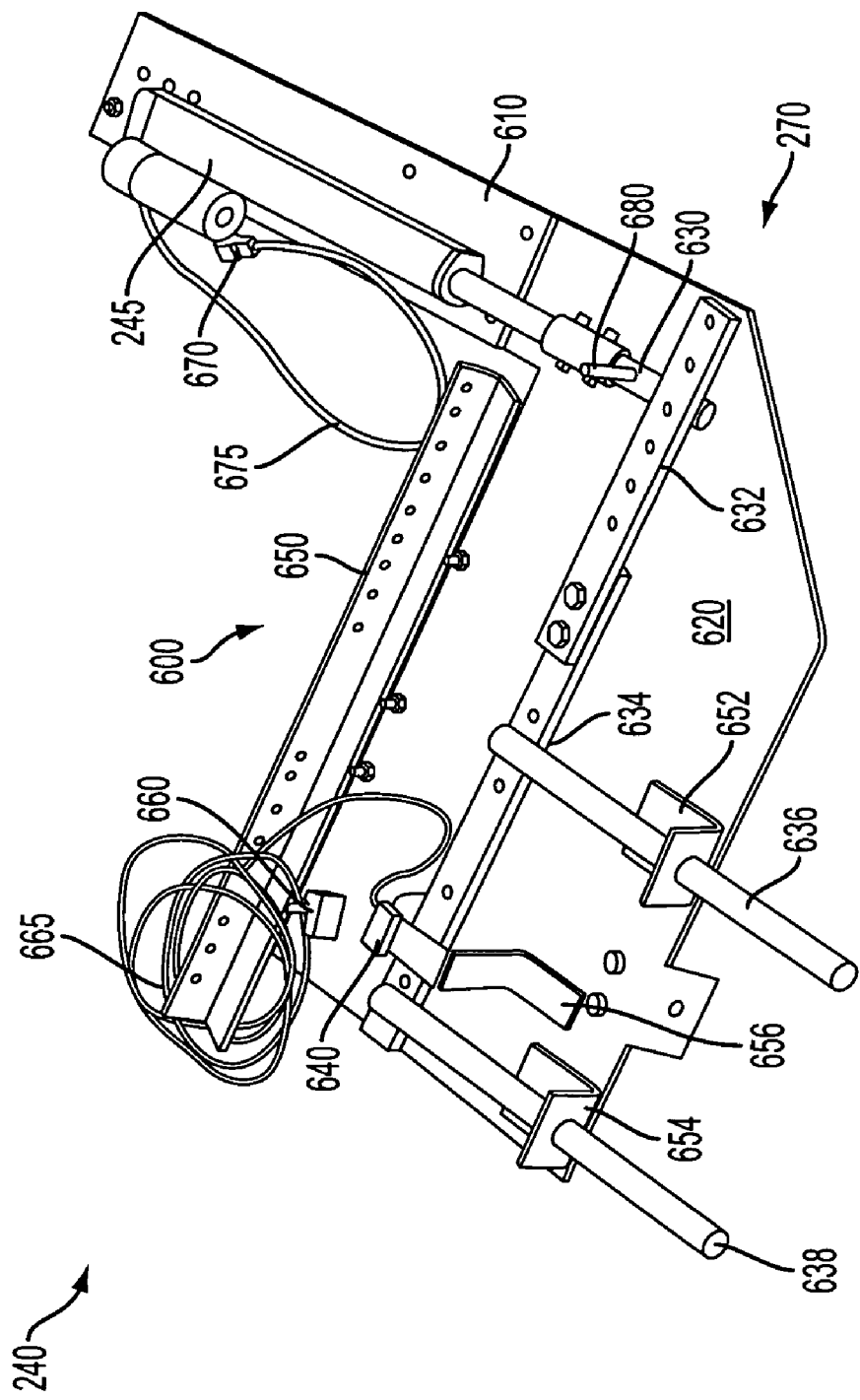
FIGS. 6A and 6B are perspective views of foot pedal linkage components of the remote control system.
Figure 6B:
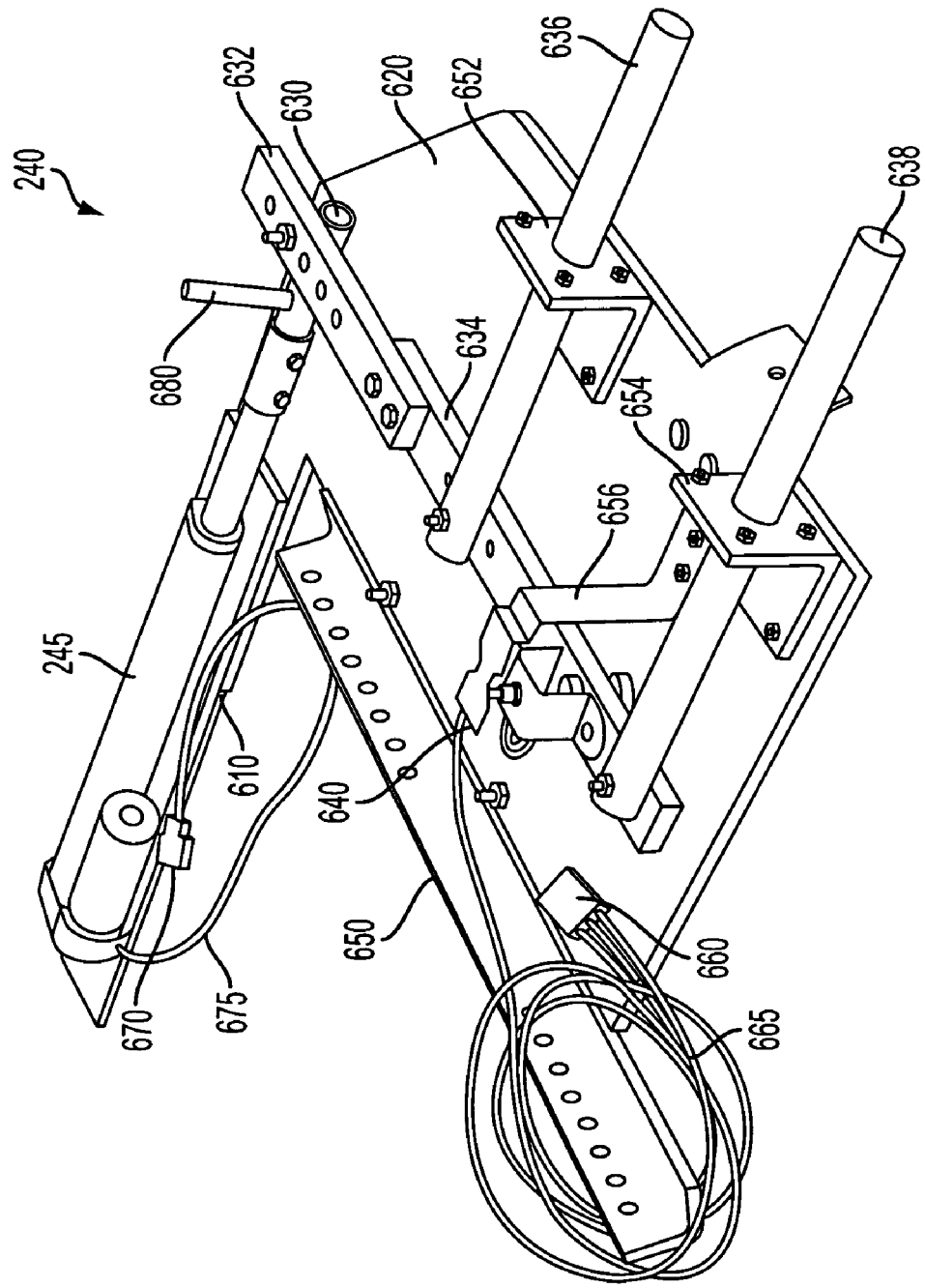

FIG. 2C shows the linkage assembly 240 including a linear actuator 245, a connection lever 270, brake linkage members 280 and accelerator linkage members 285, with further details shown in FIGS. 6A and 6B. Contact with the vehicle accelerator and brake pedals may be engaged by foot pedal engagement members 290, with further details shown in FIG. 6C.

The actuator 245 pulls and pushes the connection lever 270 at its pinned drive end. In response to the actuator 245 retreating inward (aft), the accelerator linkage members 285 press forward to engage the vehicle's accelerator pedal. In response to the actuator 245 extending outward (forward), the brake linkage members 280 press forward to apply the vehicle's brakes. Artisans of ordinary skill will recognize that alternate configurations for assembling functionally equivalent components may be employed without departing from the scope of the invention. As an alternative configuration, individual linear actuators may be used for the brakes and accelerator in lieu of the connection lever 270 and associated components described herein.

Figure 3:
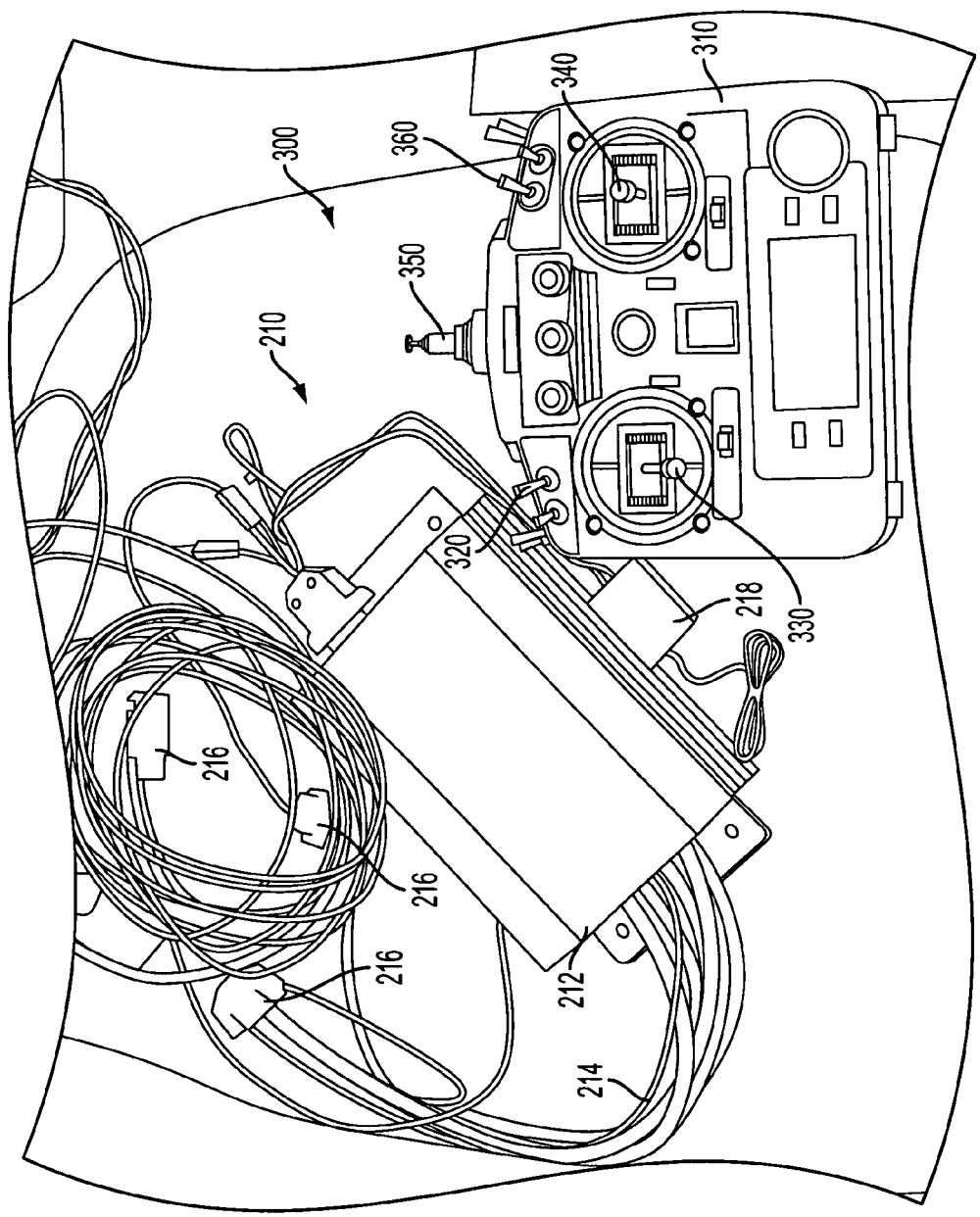
FIG. 3 is a perspective view of receiver, motor controller and transmission components for the remote control system.

FIG. 3 shows a perspective view of a communication system 300 that includes the receiver 218. A radio-control transmitter 310 relays manual instructions from an operator upon activation of an on-off toggle switch 320. A yaw joy-stick 330 provides proportional steering control. A pitch joy-stick 340 provides proportional acceleration and brake control. The joy-stick signals may be transmitted via an antenna 350. A fail-safe override switch 360 commands the brakes to be engaged and overrides any inputs from the pitch joy-stick 340. Similarly, the controller 212 may issue a brake command upon loss of signal from the transmitter 310. In addition, in the event of low voltage to the receiver, it will issue a brake command.

In response to the pitch joy-stick 340 moving fore and aft, the receiver 218 submits commands to push the accelerator and brake pedal members 295 and 290, respectively. In response to the yaw joy-stick 330 moving left and right, the receiver 218 submits commands to turn the steering wheel towards port and starboard, respectively. Artisans of ordinary skill will recognize that alternate equipment for providing, transmitting and receiving control signals may be employed without departing from the scope of the invention. Alternative configurations for the dual joy stick transmitter 310 include those with a "wheel" to control steering and a "trigger" to control the accelerator and brake.

Figure 4A:
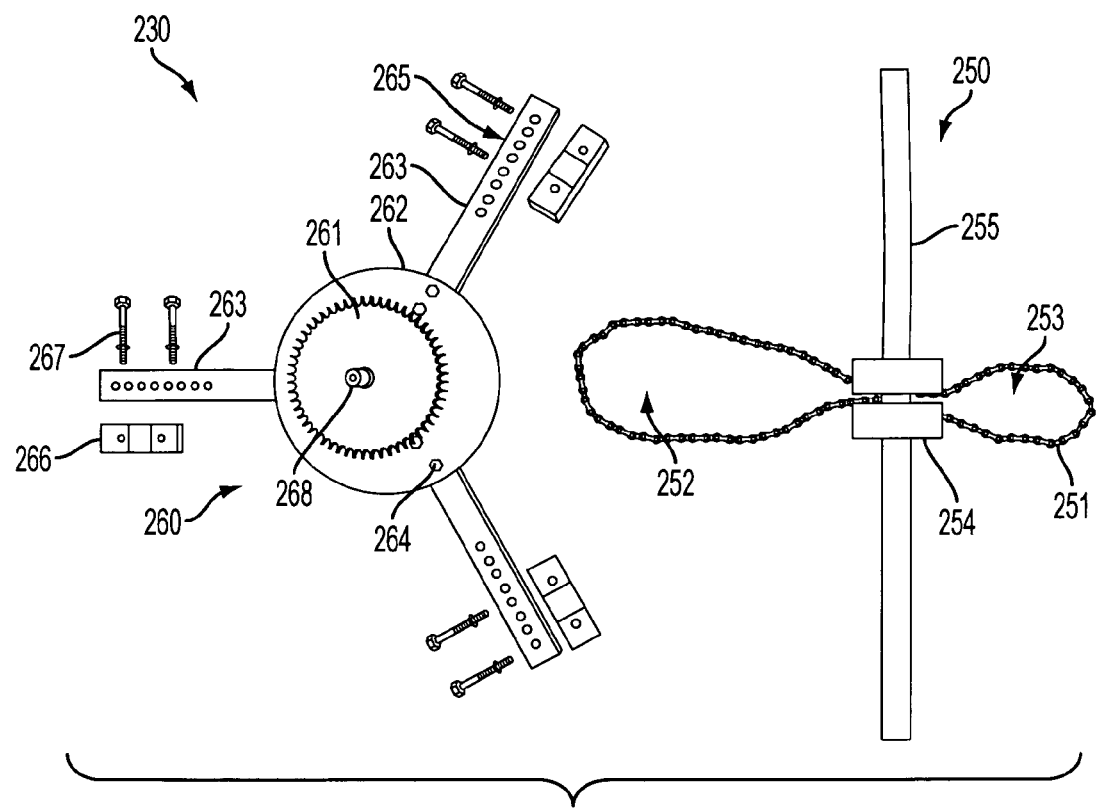
FIGS. 4A and 4B are perspective views of steering wheel control components of the remote control system.
Figure 4B:
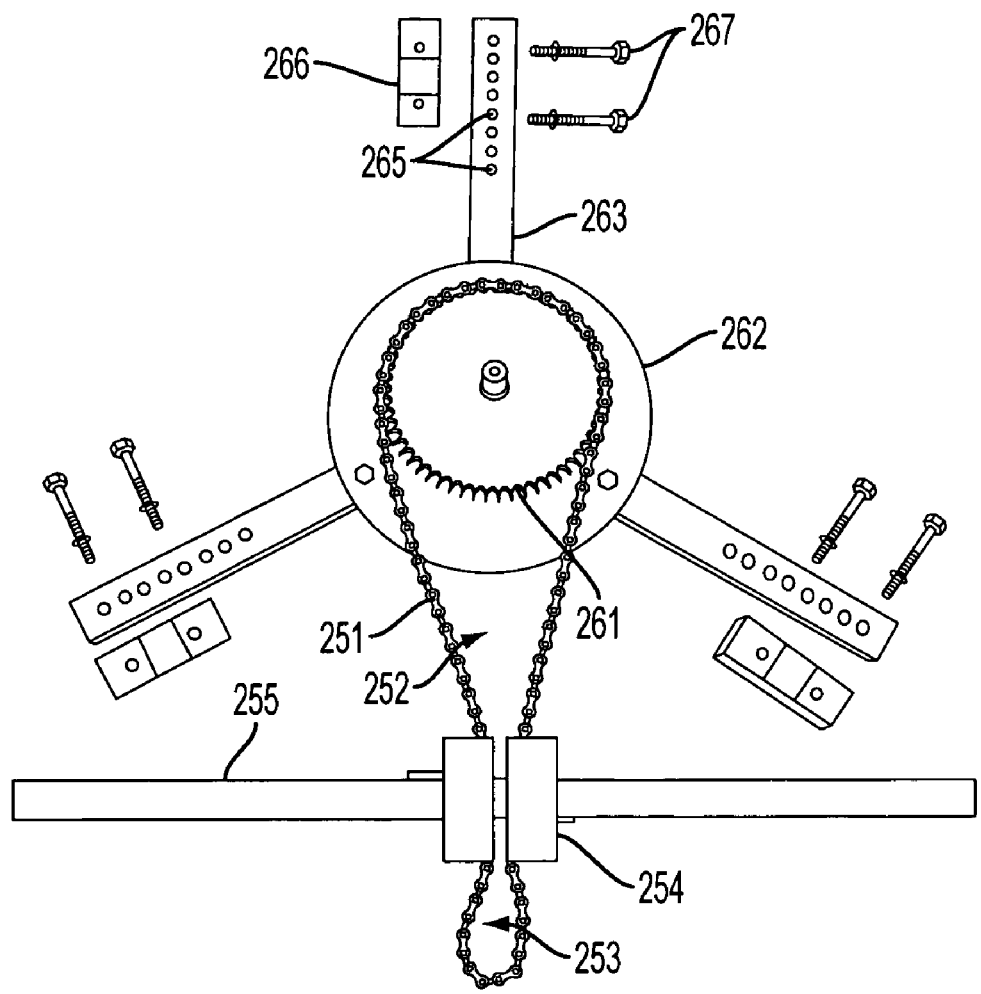

FIGS. 4A and 4B show exploded and assembled perspective views, respectively, of the linkage assembly 240. The chain drive 250 includes a continuous-loop roller chain 251 between upper and lower ends 252, 253. The steering motor 220 may connect to the lower end 253 by a small sprocket. The chain drive 250 further includes a chain traction cinch 254 and a flexible adjustment strap 255. The chain 251 rolls through the cinch 254 to permit the steering motor 220 to convey torque to the wheel attachment 260, which thereby turns the steering wheel 120.

The wheel attachment 260 includes a toothed sprocket wheel 261 rigidly connected to a mounting wheel 262. The sprocket wheel 261 may connect to the chain 251 at the upper end 252. Connection arms 263 radiating from a hub attach to the mounting wheel 262 by bolts 264. The arms 263 include a series of through-holes 265 along a portion of its length to adjust the radius of the wheel attachment 260 to the steering wheel 120.

A mount block 266 detachably attaches to each arm 263 on opposite sides of the steering wheel 120, and are secured by pins 267 that extend through the holes 265. A steering axle 268 may extend from the turning axis of the wheel attachment 260. Artisans of ordinary skill will recognize that alternate design configurations for steering wheel control linkages, such as a loop belt or a gear transmission, may be employed without departing from the scope of the invention. As an alternative configuration, a belt and pulley system can be used in lieu of the chain and sprocket drive mechanism described herein. If only limited steering control is desired, a single linear actuator can be mounted directly between the outer edge of the steering wheel and a control mount assembly described further in FIGS. 5B and 5C.

Figure 5A:
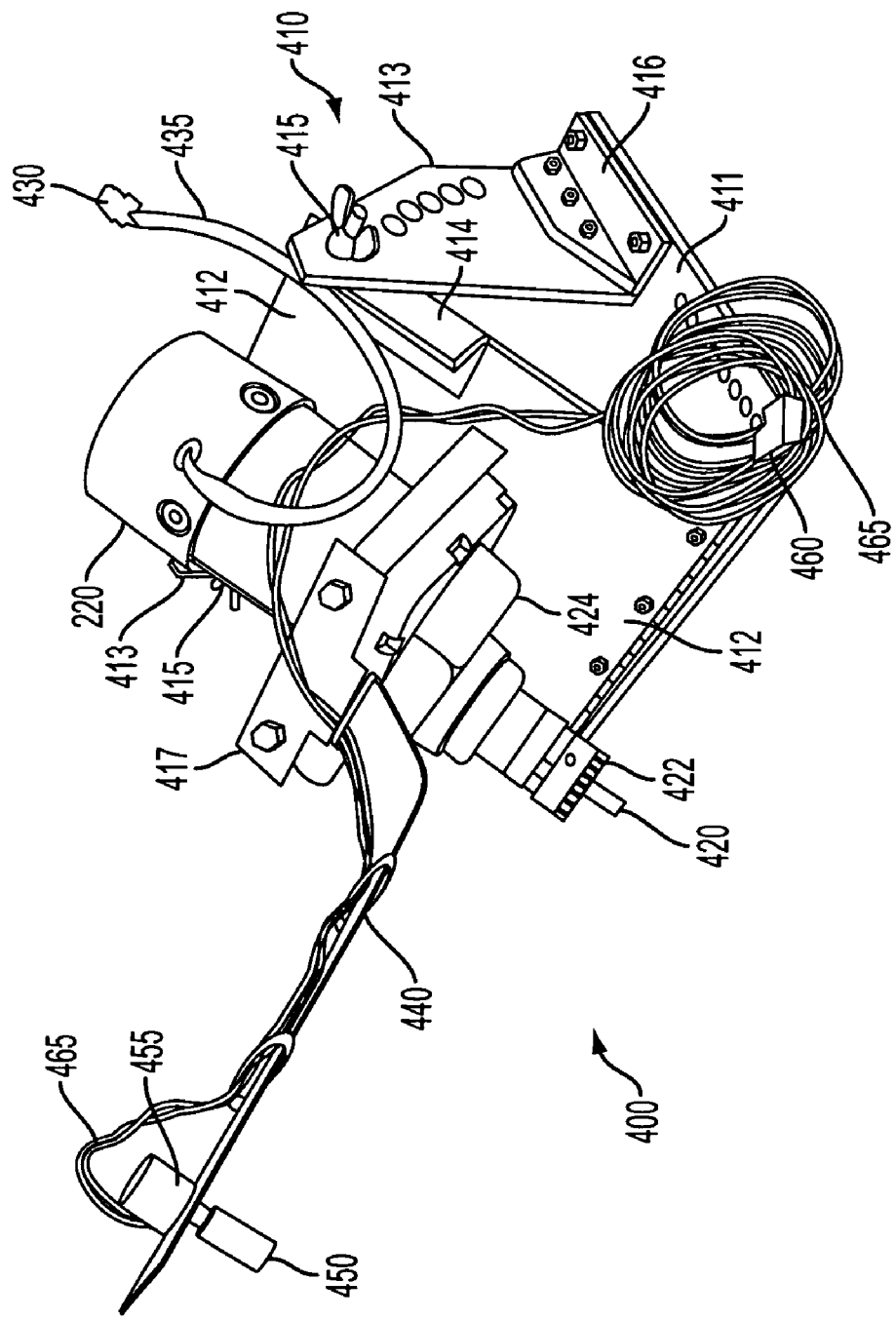
FIG. 5A is a perspective view of steering motor components of the remote control system.

FIG. 5A shows a perspective view of the steering motor 220 mounted into a motor assembly 400 that includes an angularly adjustable platform 410 to compensate for the tilt of the steering wheel 120. This includes a motor base plate 411, an angle plate 412 and a pair of support plates 413. The angle plate 412 may be positioned to the support plates 413 by accompanying L-brackets 414 and bolts with wing nuts 415. The support plates 413 may be secured to the base plate 411 by accompanying brackets 416 and bolts. Artisans of ordinary skill will recognize that alternate design configurations for the platforms and their support may be employed without departing from the scope of the invention. For example, the support brackets may be replaced by latchable hinges to enable the plates to be folded for storage.

The steering motor 220 may be secured to the angle plate 412 by a mount bracket 417. The plates 411, 412 and 413 may be fiberglass or any other appropriate stiff material having adequate mechanical and dielectric characteristics. The brackets 414, 416 and 417 may be aluminum or any other structural material that serves this purpose.

A torque axle 420 turns a small sprocket or chuck 422 that engages the roller chain 251 at its lower end 253. The torque axle 420 transfers mechanical power from a gear transmission 424 housed within the mount bracket 417 and connected to the steering motor 220. A connector 430 supplies signals from the receiver 218 to the steering motor 220 through a cable 435.

A cantilever plate 440 may optionally attach to the mount bracket 417 for disposing a rotation sensor 450 connected to the steering axle 268. A potentiometer 455 responds to the rotation sensor 450 as turn feedback to the motor controller 212 through a connector 460. The potentiometer 455 and connector 460 may communicate through a cable 465.

Figure 5B:
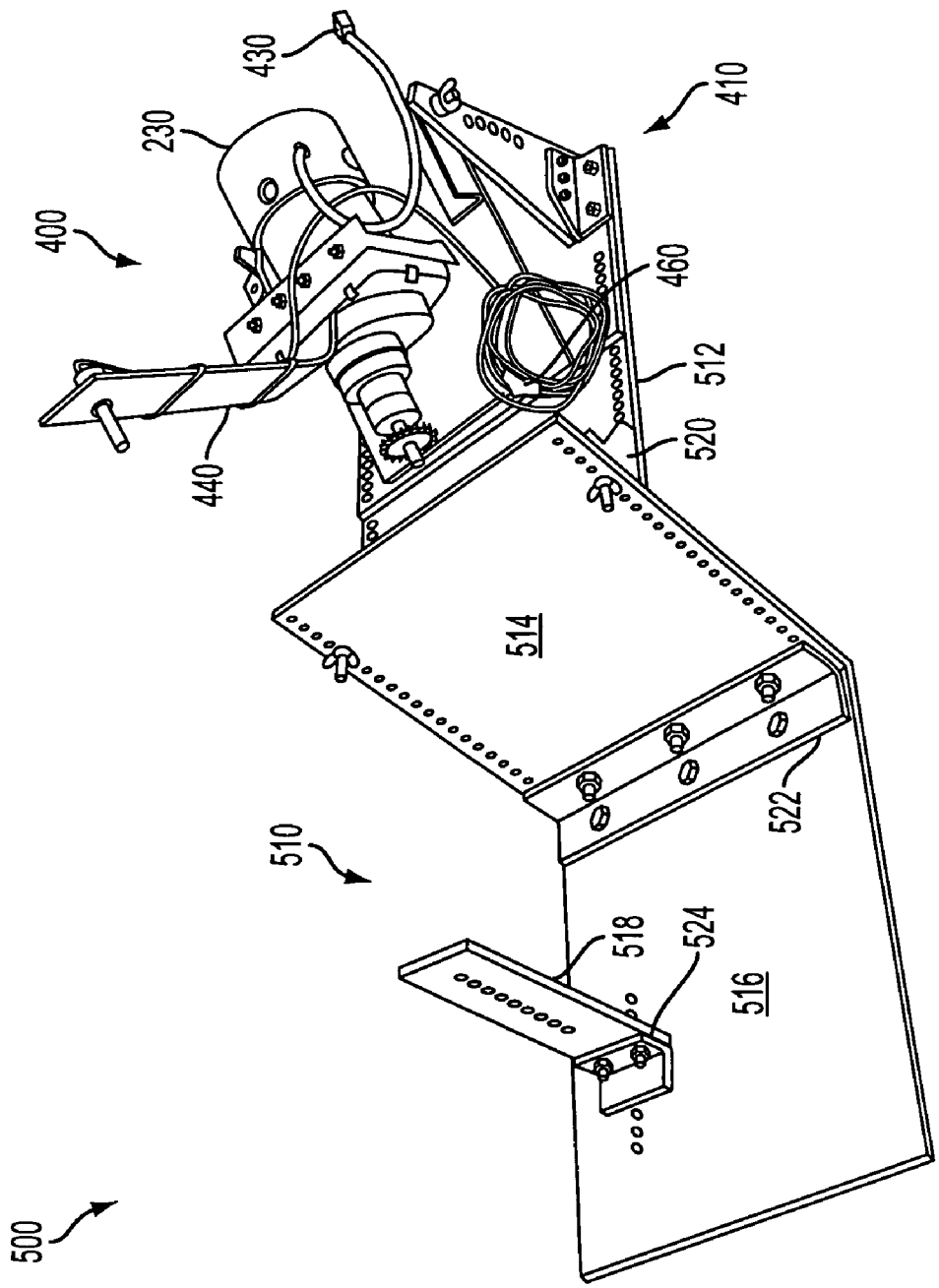
FIGS. 5B and 5C are perspective views of steering motor components and associated mounts of the remote control system.
Figure 5C:
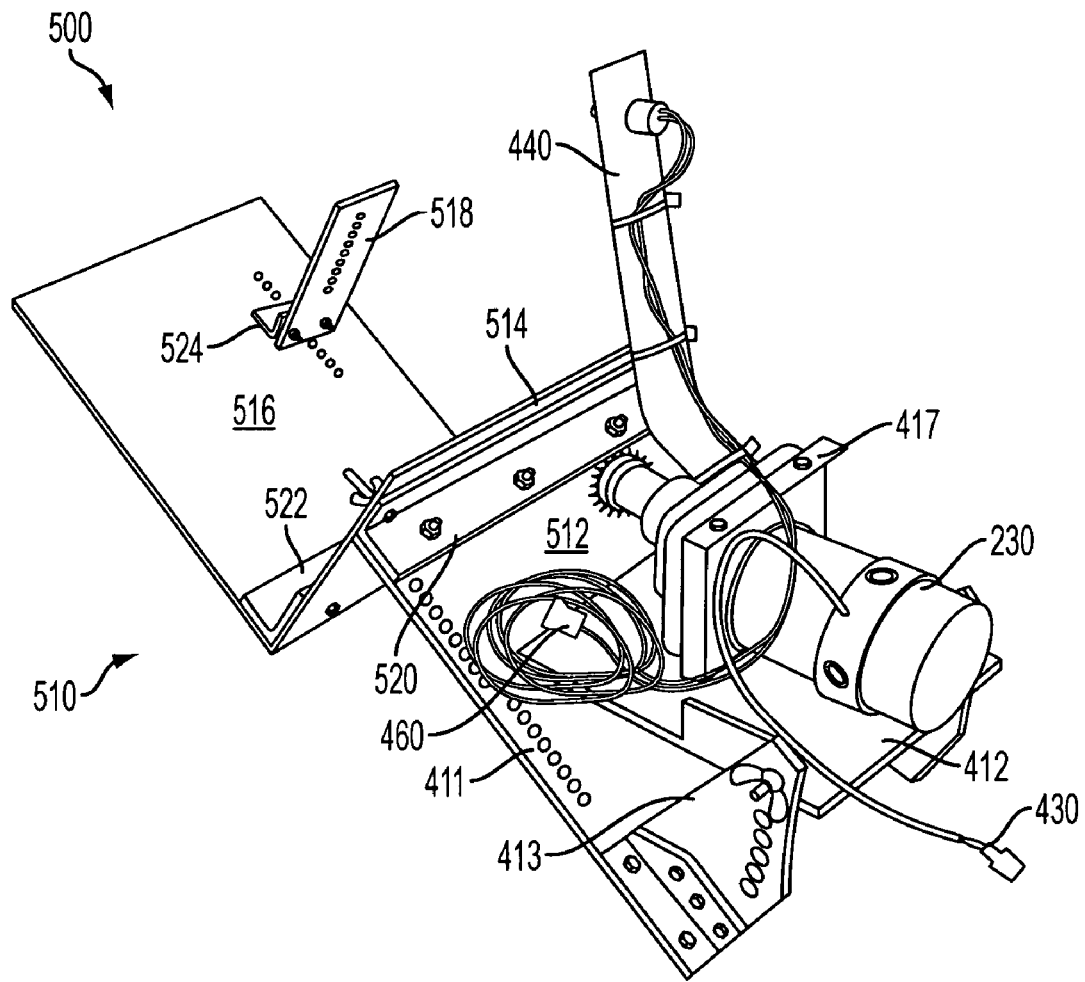

FIGS. 5B and 5C show a control mount assembly 500 including the motor mount assembly 400 and a pedal control mount 510 attached thereto. The pedal control mount 510 includes a motor extension plate 512, a transition plate 514, a floor plate 516 and a pedal mount plate 518. The motor extension plate 512 may rest on the seat 110.

The motor base plate 411 may attach onto the motor extension plate 512 by bolts through co-linear alignment holes. The extension plate 512 may connect to the transition plate 514 by an extension L-bracket 520. The transition and pedal mount plates 514, 518 may attach to the floor plate 516 by respective L-brackets 522, 524. Artisans of ordinary skill will recognize that alternate design configurations for step motor mount and control may be employed without departing from the scope of the invention.

FIGS. 6A and 6B show perspective views of the pedal linkage assembly 240 mounted to a linkage platform 600, which rests against the mount plate 518 when installed. The linear actuator 245 may be disposed on an actuator plate 610. The connection lever 270 may be disposed on a linkage plate 620. A linkage attachment 630 may be disposed at the end of the linear actuator 245. A near arm or member 632 may be pivotably connected to the attachment 630 at one end connecting to the actuator 245 and rigidly attached to a far arm or member 634 at the other end.

The near and far members 632 provide moment leverage for the pedal linkages that include a brake leg 636 and an accelerator leg 638, both pivotably connected to the far member 634. A feedback sensor 640 disposed on the sensor bracket 656 is located at the pivot point of far member 634 and provides measurement information on the relative position, e.g., angular disposition, of the components for the linkage assembly 240.

A hinged linkage bracket 650 connects the linkage plate 620 to the mount plate 514. The brake and accelerator legs 636, 638 may be supported by respective leg brackets 652, 654. The far member 634 may be bolted to a bearing bolted to the linkage plate 620 and/or supported by a linkage bracket 656. The motor controller 212 may communicate with the position feedback sensor 640 by a sensor electrical connector 660 over a cable 665. The sensor 640 may represent a potentiometer supported by the linkage bracket 656 for measuring an angular position of the connection lever 270 in relation to the actuator 245.

The motor controller 212 may communicate with the linear actuator 245 by an actuator electrical connector 670 over a cable 675. A mechanical disconnect mechanism, such as a releasable pin 680, may be pulled out to manually disengage the actuator 245 from the attachment 630 and thereby separate the connection lever 270. The connection lever 270 may be spring loaded to pivot so as to extend the brake and retract the accelerator pedals in the absence of countervailing force from the actuator 245.

Alternatively, a thumb-screw may be employed to rotate and retract, thereby separating the actuator 245 from the attachment 630. Once manually disengaged, a spring between 632 and 620 applies pressure to the brake pedal. Artisans of ordinary skill will recognize alternate design configurations for the connection without departing from the scope of the invention. For example, parts 245 and 630 may be connected via a rod on part 245 with a tube on part 630 with a threaded thumbscrew to provide connection via a frictional fit when the thumbscrew is tightened. When the thumbscrew is unscrewed, the two pieces will disengage. In addition, a coiled spring can be used around the pivot point of 634 to apply pressure to the brakes, when disengaged.

The pin/thumbscrew lever may be activated by a cord attached to the pin or thumbscrew lever. Alternatively, the mechanical disconnect can be actuated by servo using another radio control system on a different frequency (i.e., the main system on 75 MHz and the safety disconnect system on 2.4 GHz with Spread Spectrum, or vice versa).

Figure 6C:
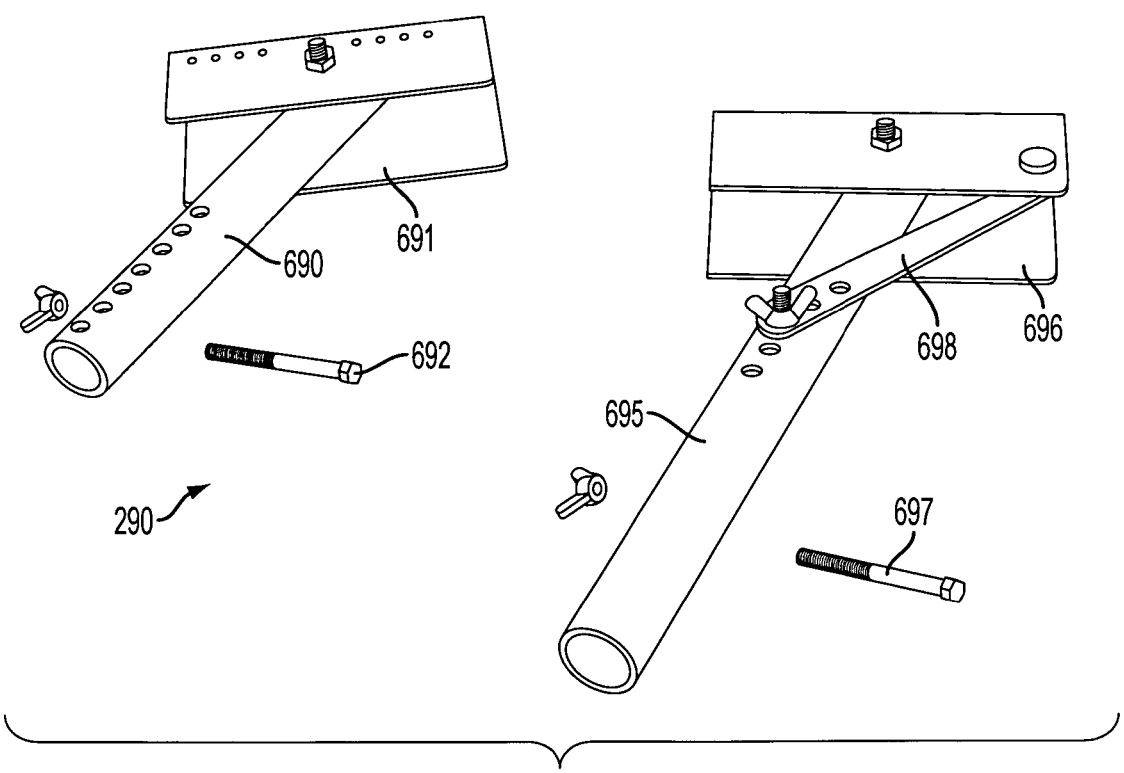
FIG. 6C is a perspective view of foot pedal engagement components of the remote control system.

FIG. 6C shows a perspective view of the foot pedal engagement components 290. The brake leg 636 may be connected to a brake extension 690, which terminates with a brake contact pad 691. The length of the extension 690 may be adjusted along the brake leg 636 and secured with a brake adjustment pin 692. The accelerator leg 638 may be connected to an accelerator extension 695, which terminates with an accelerator contact pad 696.

The length of the extension 695 may be adjusted along the accelerator leg 636 and secured with an accelerator adjustment pin 697. The angular orientation of the contact pad 696 with respect to the vehicle's accelerator pedal may be adjusted by several holes in an angle strut 698 and secured by a wing nut. Artisans of ordinary skill will recognize that alternate design configurations for pedal control linkages may be employed without departing from the scope of the invention. Any telescoping tube with a positive locking mechanism may be used for the legs and/or extensions.

Figure 7:
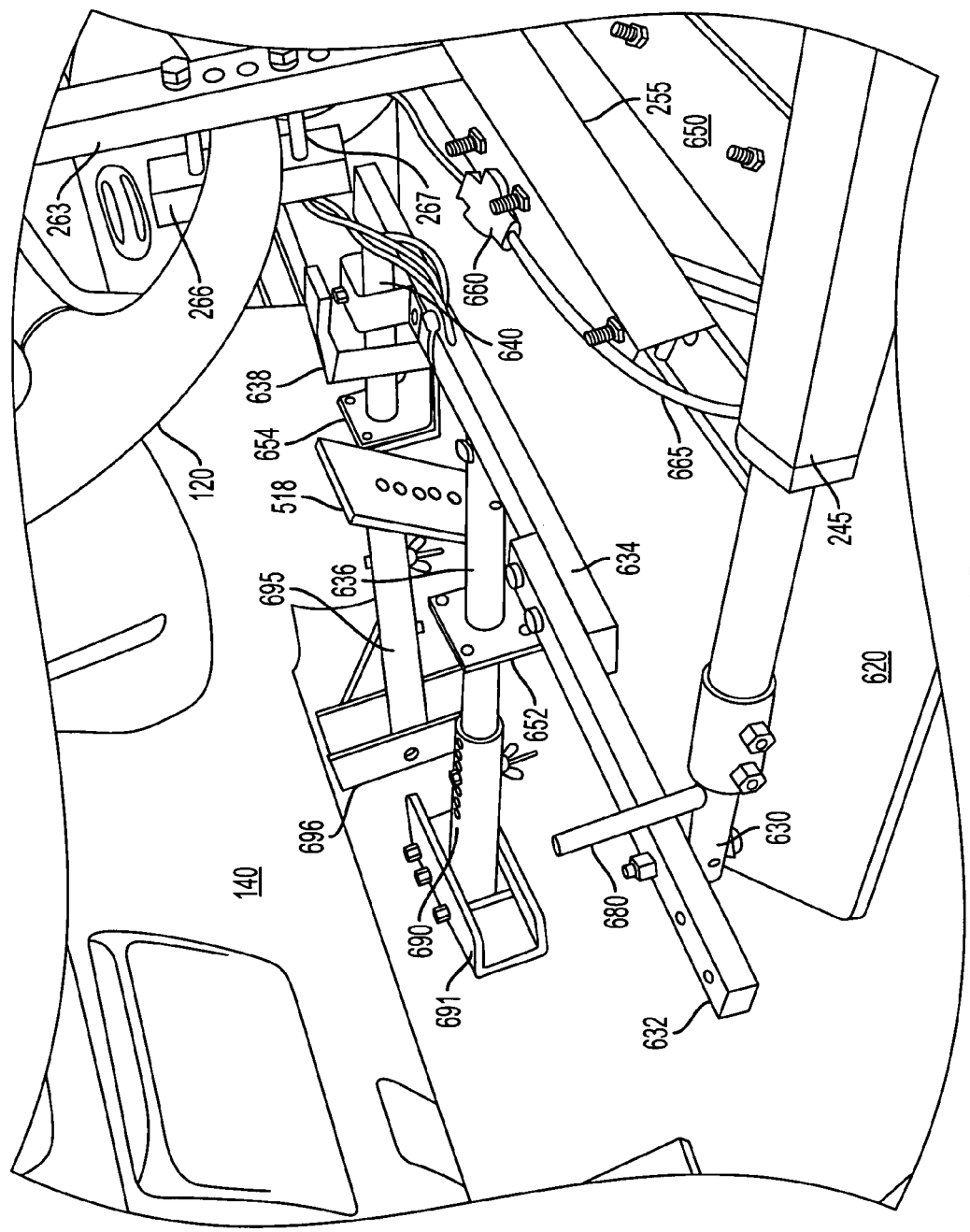
FIG. 7 is a perspective view of the vehicle interior with the remote control system components associated with foot pedals.

FIG. 7 shows a perspective view of the vehicle interior 100 with remote control system components associated with the pedal linkage assembly 240 under the dashboard 140. The actuator 245, with the pin 680 engaged, connects to the near member 632 fastened to the far member 634. The brake and accelerator pads 691, 696 alternately translate fore and aft based on extension or retraction of the actuator 245. The attachment arm 263 and block 266 connect to the steering wheel 120 as shown.

The remote control system as described may be installed into a variety of automobiles, such as cars and trucks. This system may also be suitable for watercraft as well. Due to the modularity of the assembly, separate components can be disassembled and stowed for transport to another vehicle for subsequent installation.

Figures 1, 8A:
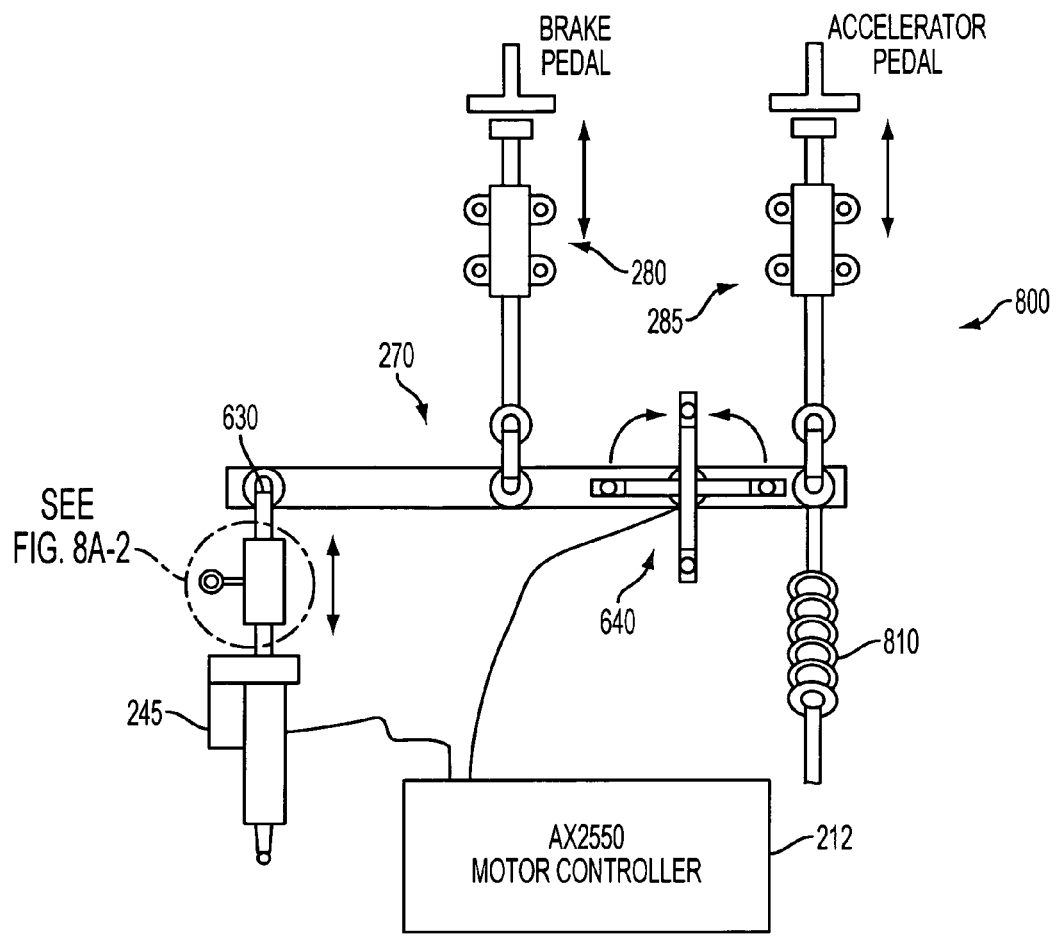
FIGS. 8A and 8B are block diagrams of the remote control system.
Figures 2, 8A:
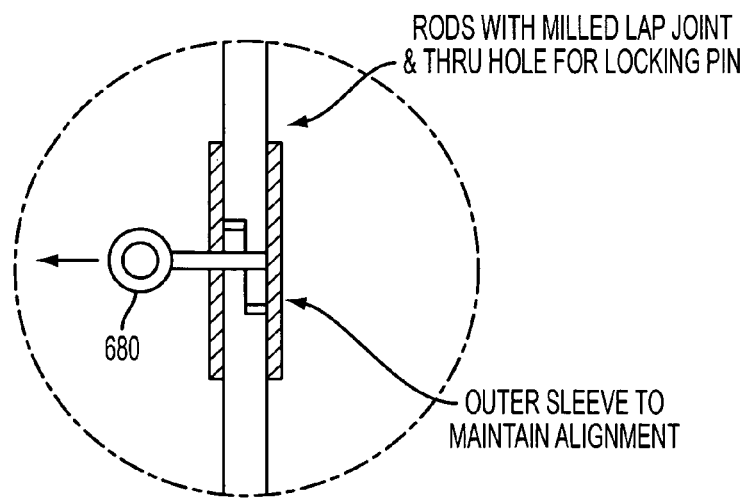
Figure 8B:
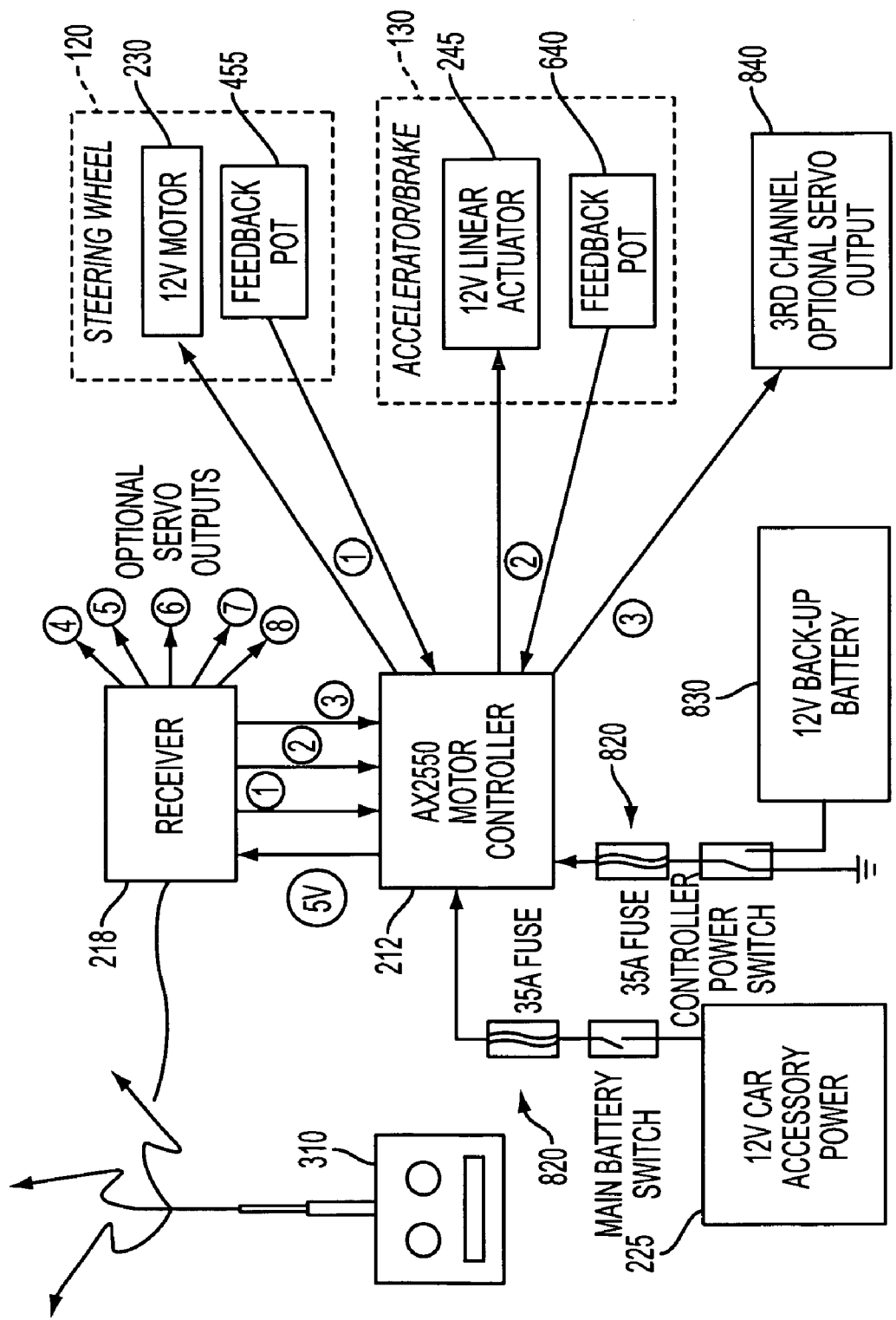

FIGS. 8A and 8B illustrate block diagrams of the remote control system 800. In particular, FIG. 8A shows the motor controller 212 receiving feedback from the potentiometer 640 to thereby command the actuator 245 for controlling the brake linkage members 280 and the accelerator linkage members 285. The removable pin 680 locks the sleeves to maintain alignment, thereby connecting the actuator 245 with the linkage attachment 630 to pivot the connection lever 270. A return spring 810 may pull the connection lever 270 at the opposite end to counteract the actuator 245 to pivot the connection lever 270 clockwise thereby causing the actuator linkage members 285 to retract and extend the brake linkage members 280.

FIG. 8B shows the transmitter 310 sending command signals to the receiver 218. Upon receiving the signals, the controller 212 receives power from the battery 225 via protective connectors 820 such as switches and/or fuses. Alternatively, power may be provided by or backup battery 830. The controller 212, having at least two channels, supplies control signals for controlling the steering wheel 120 and the accelerator and brake pedals 130. The first channel may control steering by control of the motor 230 with feedback received from the potentiometer 455. The second channel may control acceleration and braking control by the linear actuator 245 with feedback received from the potentiometer 640. An optional third channel 840 may achieve control optional servos.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A modular system for remotely controlling an automotive vehicle responsive to a radio control transmitter, the vehicle having a steering device and respective control pedals for acceleration and braking, the system comprising:
- a steer linkage that removably attaches to and controllably rotates the steering device;
- a motor that conveys torque to the steer linkage;
- a pedal linkage that removably connects to and pushes against alternatively one of an accelerator control pedal for acceleration and a brake control pedal for braking;
- an actuator that transmits force to the pedal linkage such that the actuator moves in fore and aft directions,
- wherein the pedal linkage further includes:
  - a brake pad that adjustably engages the brake control pedal,
  - a brake leg to which the brake pad can removably attach,
  - an accelerator pad that adjustably engages the accelerator control pedal,
  - an accelerator leg to which the accelerator pad can removably attach,
  - a link arm pivotably connected to the actuator, the brake leg and the accelerator leg, wherein
    - the link arm presses the brake leg forward and retracts the accelerator leg aft in response to extension of the actuator, and
    - the link arm presses the accelerator leg forward and retracts the brake leg aft in response to retraction of the actuator;
- a radio receiver that receives command signals from the transmitter; and
- a controller that communicates the command signals to the motor and the actuator.

2. The system according to claim 1, wherein the pedal linkage is removably mounted on a linkage platform.

3. The system according to claim 2, wherein the motor is removably mounted to the linkage platform.

4. The system according to claim 2, wherein the linkage platform comprises modular components for assembly and disassembly.

5. The system according to claim 1, wherein the steer linkage comprises:
- a wheel hub with radiating arms that removably attach to a rim of the steering wheel, the arms being adjustable to fit thereon;
- a hub sprocket that connects and transmits torque to the wheel hub;
- a transmission that connects to the sprocket in a continuous loop; and
- a motor sprocket that connects to the transmission, wherein the motor turns the motor sprocket to engage the transmission, wherein the wheel hub rotates in response to the motor turning.

6. The system according to claim 5, wherein the transmission is a chain pulley that rolls in response to the motor sprocket turning.

7. The system according to claim 6, wherein the steer controller further comprises a cinch that tightens the chain pulley to avoid slippage.

8. The system according to claim 5, wherein the steer controller further comprises a feedback sensor to measure rotational position of the hub.

9. The system according to claim 8, wherein the sensor is a potentiometer.

10. The system according to claim 1, wherein the motor and the actuator are powered by a direct-current battery.

11. The system according to claim 1, wherein the pedal linkage further comprises a mechanical disconnect mechanism to separate the link arm from the actuator.

12. The system according to claim 1, wherein the pedal linkage further comprises a feedback sensor to measure angular disposition of the pedal linkage.

13. The system according to claim 12 wherein the sensor is a potentiometer.

14. The system according to claim 1, wherein the controller commands retraction of the actuator to retract the accelerator leg and press the brake leg in response to loss of signal from the transmitter.

15. The system according to claim 1, wherein the controller is a digital proportional motor controller.

16. The system according to claim 1, wherein the receiver uses a pulse code modulation.

17. The system according to claim 11, wherein the link arm includes spring-loading to retract the accelerator leg and press the brake leg.

* * * * *